United States Patent
Tazebay et al.

(10) Patent No.: US 6,680,971 B1
(45) Date of Patent: *Jan. 20, 2004

(54) PASSBAND EQUALIZER FOR A VESTIGIAL SIDEBAND SIGNAL RECEIVER

(75) Inventors: Mehmet Vakif Tazebay, Monmouth Junction, NJ (US); Randall Bret Perlow, Washington Crossing, PA (US)

(73) Assignees: Sarnoff Corporation, Princeton, NJ (US); Motorola Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,477

(22) Filed: Dec. 7, 1998

Related U.S. Application Data

(60) Provisional application No. 60/085,864, filed on May 18, 1998.

(51) Int. Cl.⁷ .......................... H04N 5/455; H04N 5/46; H03H 7/40
(52) U.S. Cl. ................. 375/235; 375/233; 348/726; 348/558; 348/914
(58) Field of Search .................. 348/914, 725, 348/726, 555, 558; 375/233, 235; 364/724.19

(56) References Cited

U.S. PATENT DOCUMENTS

| | | | |
|---|---|---|---|
| 4,730,343 A | | 3/1988 | Kanemasa et al. |
| 4,733,402 A | * | 3/1988 | Monsen ...................... 375/101 |
| 5,095,497 A | * | 3/1992 | Aman et al. ................. 375/34 |
| 5,162,812 A | * | 11/1992 | Aman et al. ................. 375/34 |
| 5,200,978 A | * | 4/1993 | Lo Curto et al. ............. 375/17 |
| 5,283,811 A | * | 2/1994 | Chennakeshu et al. ....... 375/14 |
| 5,297,166 A | * | 3/1994 | Batruni ........................ 375/14 |
| 5,353,306 A | * | 10/1994 | Yamamoto .................... 375/14 |
| 5,386,239 A | | 1/1995 | Wang et al. |
| 5,425,057 A | * | 6/1995 | Paff ............................ 375/326 |
| 5,539,774 A | * | 7/1996 | Nobakht et al. ............. 375/232 |
| 5,572,262 A | * | 11/1996 | Ghosh ......................... 348/607 |
| 5,642,382 A | * | 6/1997 | Juan ............................ 375/232 |
| 5,646,958 A | * | 7/1997 | Tsujimoto .................... 375/235 |
| 5,648,988 A | * | 7/1997 | Iwamatsu et al. ............ 375/232 |
| 5,661,528 A | | 8/1997 | Han ............................ 348/607 |
| 5,673,293 A | * | 9/1997 | Scarpa et al. ................ 375/323 |
| 5,689,528 A | * | 11/1997 | Tsujimoto .................... 375/233 |
| 5,692,011 A | * | 11/1997 | Nobakht et al. ............. 375/233 |
| 5,706,057 A | * | 1/1998 | Strolle et al. ................ 348/426 |
| 5,717,715 A | * | 2/1998 | Claydon et al. ............. 375/220 |
| 5,793,807 A | * | 8/1998 | Werner et al. ............... 375/233 |
| 5,799,037 A | * | 8/1998 | Strolle et al. ................ 375/233 |
| 5,805,242 A | | 9/1998 | Strolle et al. ................ 348/726 |
| 5,835,532 A | * | 11/1998 | Strolle et al. ................ 375/233 |
| 5,835,731 A | * | 11/1998 | Werner et al. ............... 375/235 |
| 5,872,815 A | | 2/1999 | Strolle et al. ................ 375/321 |
| 5,894,334 A | | 4/1999 | Strolle et al. ................ 348/725 |
| 6,067,319 A | * | 5/2000 | Copeland ..................... 375/232 |
| 6,088,390 A | * | 7/2000 | Russell et al. ............... 375/233 |

\* cited by examiner

Primary Examiner—John Miller
Assistant Examiner—Paulos Natnael
(74) Attorney, Agent, or Firm—William J. Burke

(57) ABSTRACT

A passband equalizer that performs blind equalization upon a complex signal, e.g., a vestigial sideband (VSB) signal, without using a training sequence. The passband equalizer contains a decision directed equalizer (DFE) that operates upon separate in phase (I) and quadrature phase (Q) signals using a filter for the I signal and a filter for the Q signal without using filters for cross components of the I and Q signals. As such, the DFE contains approximately half of the multipliers and adders that are used in prior art DFEs.

22 Claims, 7 Drawing Sheets

PASSBAND EQUALIZER FOR A VESTIGIAL SIDEBAND SIGNAL RECEIVER

This application claims the benefit of U.S. Provisional Application No. 60/085,864 filed May 18, 1998, which is herein incorporated by reference The invention relates to vestigial sideband (VSB) signal receivers and, more particularly, the invention relates to passband equalization circuits for such VSB signal receivers.

BACKGROUND OF THE DISCLOSURE

In a terrestrial broadcast channel, a transmitted signal experiences time dispersion due to a deviation in the channel frequency response from the ideal channel characteristics of a constant amplitude and linear phase (constant delay) response. Consequently, to achieve optimal demodulation of a terrestrially broadcast signal, an equalizer is required in the receiver system to compensate for the non-ideal channel characteristics by using adaptive filtering. By correcting the amplitude and phase response of the received signal, the equalizer minimizes the intersymbol interference (ISI) of the received signal, thus improving the signal detection accuracy.

In conventional high definition television (HDTV) receivers using 8-VSB formatted data, the equalization process is accomplished at baseband, i.e., "real" equalization is accomplished after carrier and timing recovery is performed. To aid the equalization process, the data includes a data field sync signal (DFS) that repeats within the data every 24.2 milliseconds. The DFS contains a known pseudorandom bit sequence which is used as a training pattern in order to aid the equalizer in achieving an initial set of filter tap settings during start-up and after a channel change. After the system start-up process is performed using the training data, the "eye" within the "eye" pattern of the data is fairly open and symbol sampling is very accurate.

Once the start-up process is complete, the equalizer switches itself to a decision directed mode, which then tracks the slow changes in the channel response characteristics. In practice, sudden changes in the channel response characteristics (i.e., generally caused by the user changing channels) can drastically change the characteristics of the VSB signal being received, disabling the equalizer while it is operating in the decision directed mode. When this happens, the equalizer will distort the received signal since it does not compensate for the current channel response, i.e., the equalizer filter tap settings are defined for the previously selected channel. As such, the receiver begins making incorrect symbol decisions requiring the equalizer to be switched back to the training mode to achieve proper synchronization. However, to achieve proper synchronization in the training mode, the equalizer must wait until the next few DFS bit sets become available as the equalizer requires multiple DFS to achieve proper equalization for the newly selected channel. Even in the most optimistic situation where only one DFS bit set is necessary to achieve equalization, the wait would be at least 24.2 milliseconds.

Therefore, a need exists in the art for a passband equalization circuit that does not rely on the DFS to perform initial equalization such that the speed at which an equalizer reestablishes equalization is substantially improved.

SUMMARY OF THE INVENTION

The disadvantages associated with the prior art are overcome by the present invention of a passband equalizer that performs blind equalization upon a vestigial sideband (VSB) signal without using a training sequence. The passband equalizer contains a feed forward equalizer (FFE) and a decision feedback equalizer (DFE). The decision feedback equalizer operates upon separate in phase (I) and quadrature phase (Q) signals using a filter for the I signal and a filter for the Q signal without using filters for cross components of the I and Q signals. As such, the DFE contains approximately half of the multipliers and adders that are used in prior art DFEs.

The equalization filters that are used in either the DFE or FFE can be either T-spaced or 2T-spaced filters, where T is the duration of one symbol. All of the filters do not need to be the same type. For example, T-spaced filters may be used in the FFE and 2T-spaced filters may be used in the DFE or vice versa. A 2T-spaced filter accomplishes the appropriate filtering with half of the multipliers than are used in a T-spaced filter. For substantial flexibility, the filters can be structured to selectively operate in either a T-spaced or 2T-spaced mode. As such, a single filter can selectively operate as a real T-spaced filter, a complex 2T-spaced filter or a complex T-spaced filter that is half the length of the real T-spaced filter.

To establish the tap weights that achieve equalization filtering, the invention uses a blind equalization algorithm such that equalization can be achieved without using a training sequence. The blind equalization algorithm performs the well-known Sato's algorithm to adapt the coefficients (tap weights) of the filters in the FFE and DFE to appropriately filter the received signal.

The inventive passband equalizer using T-spaced filters, 2T-spaced filters or a combination of both filter types, finds use in a digital television signal receiver such as a high definition television (HDTV) set. The inventive passband equalizer substantially reduces the number of multiplication and addition functions that need to be performed by the equalizer. As such, the complexity and therefore the cost of the receiver is substantially reduced as compared to a digital television receiver that uses a conventional baseband equalizer. Furthermore, the passband equalizer of the present invention uses blind equalization and does not rely on a training sequence to establish the tap weights of the filters.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
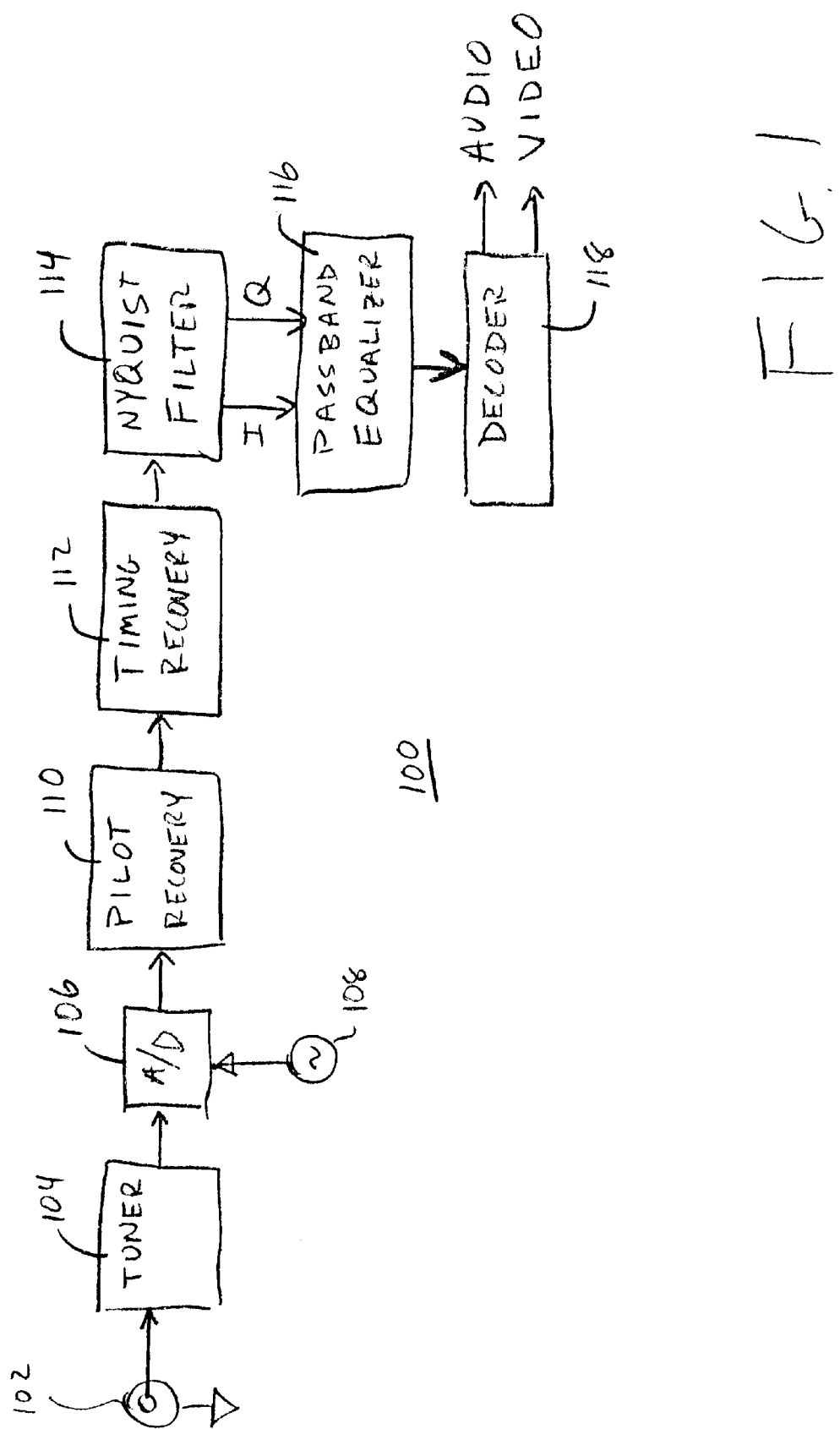
FIG. 1 depicts a high level block diagram of a VSB receiver containing the present invention.

FIG. 1 depicts a high level block diagram of a vestigial sideband (VSB) signal receiver 100 of a type used to receive high definition television (HDTV) signals. The VSB receiver 100 has an input port 102 that is generally connected to an antenna and/or a cable system that supplies a plurality of VSB signals to the receiver 100. The receiver 100 selects one of the VSB signals in the plurality of available VSB signals, demodulates the selected VSB signal to extract the data contained therein, and processes the data to recover video and audio signals for display to a viewer.

The receiver 100 contains a tuner 104, an analog-to-digital converter 106, an oscillator 108, a pilot recovery circuit 110, a timing recovery circuit 112, a Nyquist filter 114, a passband equalizer 116, and a decoder 118. The tuner 104 is generally an analog circuit that selects one channel (one VSB signal) of the many channels that are supplied to the input port 102. The selected VSB signal is coupled to the analog-to-digital converter 106 wherein the selected VSB signal is sampled at two or more times the symbol rate (e.g., four times the symbol rate) using a free running oscillator 108. The digital samples are coupled to the pilot recovery circuit 110 which frequency locks the receiver 100 to a pilot tone within the VSB signal. The frequency locking process produces a complex passband signal having the pilot tone located at DC. The frequency locked signal is then applied to the timing recovery circuit 112 that performs symbol synchronization using known synchronization bits within the received signal. Once the digital signal from the A/D converter 106 has been frequency locked and symbol synchronized, the digital signal is coupled to the Nyquist filter 114 that produces an output signal having a desired Nyquist spectral shape and a maximal signal-to-noise ratio. Generally, the Nyquist filter 114 contains a retiming circuit that resamples the filter input signal at the symbol rate (or at a rate twice the symbol rate and then decimate) and a pair of filters for extracting the in-phase (I) signal and the quadrature phase (Q) signal from the resampled VSB signal. For example, the Nyquist filter 114 may contain a complex transverse multi-tap, e.g., 64 tap, finite input response (FIR) filters designed to operate at passband frequencies. The output of the Nyquist filter 114 is a complex signal containing an I signal and a Q signal, with each having a data rate equal to the symbol rate. The passband equalizer 116 performs signal equalization as well as carrier recovery and symbol slicing (i.e., the equalizer block contains a carrier recovery circuit and symbol sliced (as described below) such that the output of the equalizer 116 is the data recovered from the VSB signal. This data is coupled to the decoder 118 to produce the audio and video information transmitted by the VSB signal.

Figure 2:
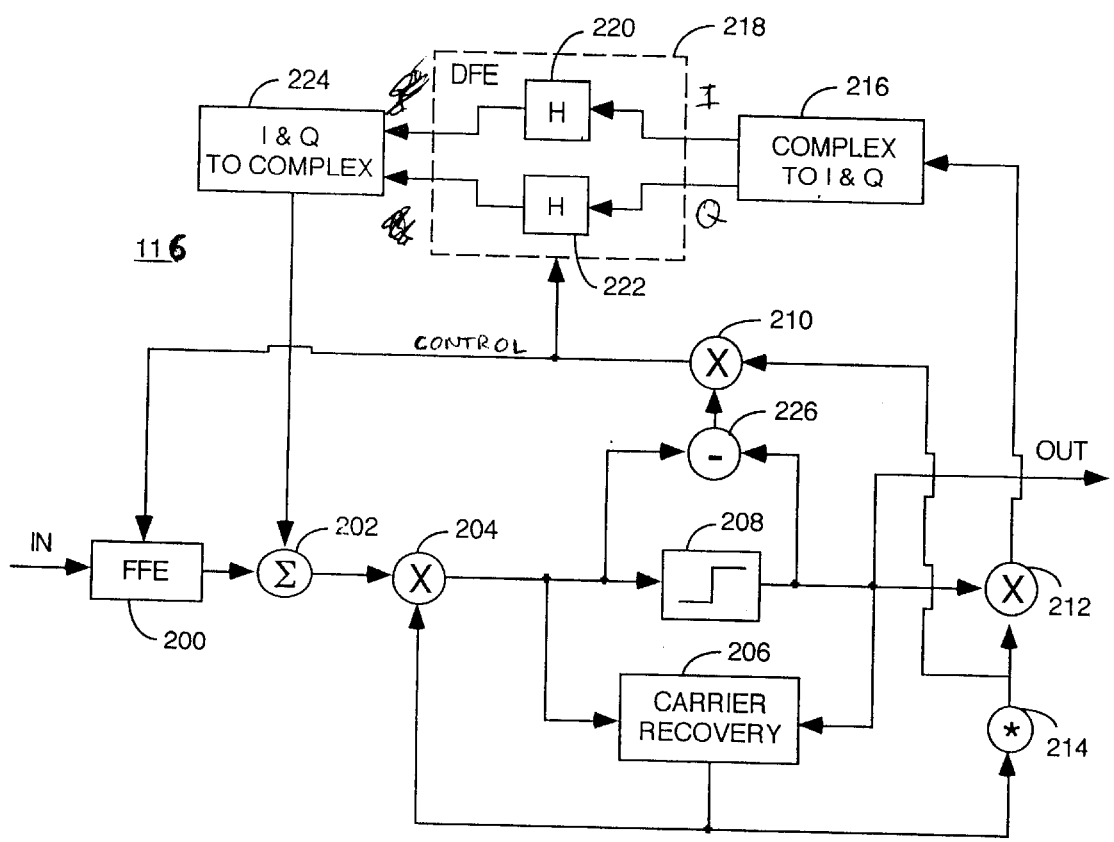
FIG. 2 depicts a passband equalizer in accordance with the present invention.

FIG. 2 depicts a detailed block diagram of a first embodiment of the passband equalizer 116 of FIG. 1. The equalizer 112 contains two principal components: complex feedforward equalizer (FFE) 200 and a decision feedback equalizer (DFE) 218. Each equalizer 200 and 218 is generally a "T-spaced" equalizer. The spacing refers to the spacing between the taps of the filters used in the equalization filters, where T is the symbol period and as such the spacing of each filter tap within the filters is one symbol period (T). The DFE, FFE and combiner 202 all operate at passband, while the slicer 208 and the carrier recovery circuitry 206 operate at baseband.

More specifically, the passband equalizer 112 contains a feed forward equalizer (FFE) 200, a combiner 202, a derotator 204, a carrier recovery circuit 206, a quantizer 208, a subtractor 226, a second rotator 210, complex conjugate circuit 214, a third rotator 212, a complex to I&Q converter 216, a decision feedback equalizer (DFE) 218 and an I&Q to complex converter 224. The input signal from the Nyquist filter (a complex signal) is coupled to the FFE 200. The output of the FFE 200 is coupled to combiner 202 wherein the output of the FFE 200 is summed with the output of the DFE 218. The output of the combiner 202 is coupled to a derotator 204 that converts the passband signal to a baseband signal which is then applied to the inputs of both the quantizer 208 (also known as a slicer) and the carrier recovery circuit 206, i.e., the derotator 204 aligns the data to the I channel. The carrier recovery circuit 206 tracks the phase of the carrier signal based on the decisions made by the quantizer 208. The quantizer error is produced by the subtracter 226 which subtracts the input signal symbols to the quantizer 208 from the quantized symbols producing an error signal that is re-rotated at second rotator 210, i.e., the rerotated error has the same phase as the input signal. The re-rotated error signal (passband error signal) is used to control both the DFE and FFE filter weighting to perform the equalization function.

The equalizer operates in three modes: (1) Blind mode, (2) Decision-Directed mode, and (3) Decision-Feedback mode. In blind mode, the slicer 208 is only used to compute the error signal produced by subtractor 226. The carrier recovery circuit 206 is bypassed such that the output of the combiner 202 is coupled directly to the input of the complex to I&Q converter 216. The equalizer is updated using the Sato algorithm such that the state of the FFE 200 and DFE 218 are initialized.

More specifically, to produce the error signal in the blind equalization mode, the multilevel VSB signal is decomposed into its polarity signal and scaled in order to obtain a reference signal. The error signal is defined by $$e_k = a_k - t*sgn(a_k)$$

where $e_k$ is the k-th symbol error, $a_k$ is the k-th received VSB symbol and t is a scaling constant computed by dividing the second moment of the random input signal by its first moment. The error signal is then used in a least mean square algorithm (Sato) in order to update the coefficients tap weights of the filters.

In the decision-directed mode, the "eyes" of the data eye pattern are partly open and the slicer is changed to an 8-level slicer. The carrier recovery circuit 206 remains bypassed. The equalizer is now updated using an error signal given by e[k]=a[k]−Q(a[k]), where Q(*) represents the slicer output having a value that is one of 8-levels that is selected by being nearest the input level.

In the decision-feedback mode, the "eyes" are open but noisy. The carrier recovery circuit 206 and the 8-level slicer are activated so that the input of the complex to I&Q converter 216 are the decision outputs generated by the slicer 208. The effect of decision feedback is to further optimize the equalizer coefficients in order to reduce the intersymbol interference (ISI), and noise in the constellation.

Once blind equalization is complete and the decision feedback equalization mode is active, re-rotation of the error signal is accomplished using the recovered carrier generated by the carrier recovery circuitry 206. The recovered carrier is applied to rotators 204, 210 and 212. However, prior to applying the recovered carrier to rotators 212 and 210, the carrier signal is applied to complex conjugate block 214 to produce a complex conjugate of the carrier signal. The quantized data signal is produced at the output of the equalizer 112.

To provide equalization, the quantized output is rotated at rotator 212 using the recovered carrier. The rotated signal has the pilot tone centered at DC such that the signal contains mostly positive signal components with a small vestige of negative frequency components. The rotated signal from rotator 212 is then applied to the complex signal to I&Q converter 216 which converts the complex signal into a pair of signals representing the in-phase (I) and quadrature phase (Q) components of the VSB signal. Each of the I and Q component signals are coupled to a single, real FIR filter 220 and 222, respectively. Note that the DFE only uses two real filters. This arrangement contrasts with the prior art where four filters are generally used in a passband DFE. As such, the invention substantially saves on the number of components used in the DFE circuitry. The FIR filters generally contain a series of taps and weights where the weights are set adaptively using the passband control signal from the multiplier 210. The filter elements are spaced one symbol period apart, i.e., the spacing is T-spaced. The output of each filter 220 and 222 is coupled to an I&Q to complex converter 224 which once again produces a complex signal representation of the individually equalized signals. The complex signal is applied to combiner 202.

Figure 3:
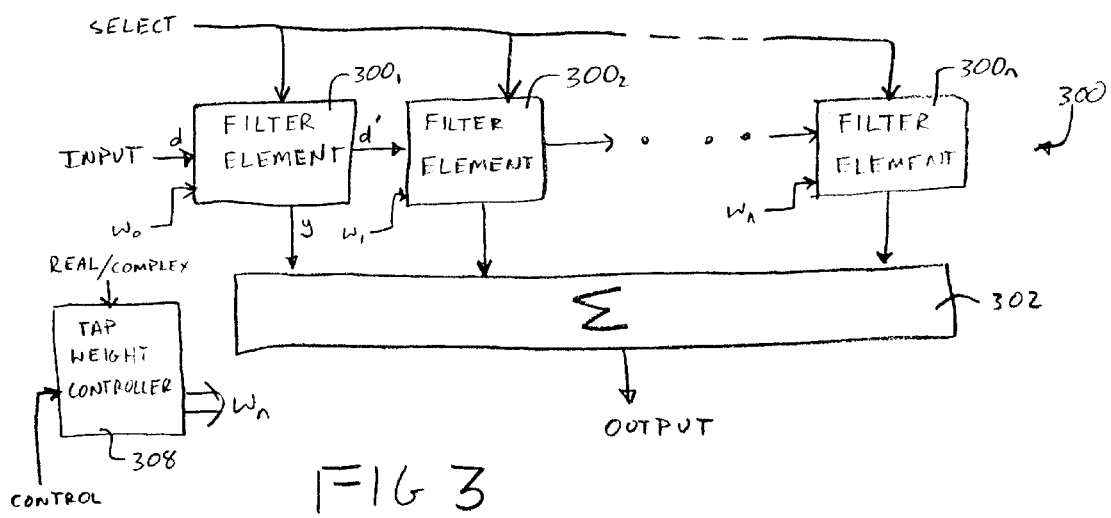
FIG. 3 depicts a block diagram of a T/2T-spaced equalization filter in accordance with the present invention.

Although the foregoing description has described the equalizer filters 220 and 222 as being conventional T-spaced FIR filters, the preferred embodiment uses a 2T-spaced equalizer circuit in at least the DFE 218 and, if desired, the FFE 200 could also use a 2T-spaced filter. FIG. 3 depicts an embodiment of a selectable T/2T-spaced filter (e.g., filter 220) in accordance with the present invention. The T/2T-spaced equalizer filter 220 comprises a plurality of series connected filter elements $300_1, 300_2, \ldots 300_n$ (collectively elements 300) each having a weighted output connected to a combiner 302. The weighting values $w_n$ are either complex or real depending upon the filter structure being used. The weighting values are produced by a tap weight controller 308 in response to a REAL/COMPLEX selection signal as well as the feedback signal from the rotator 210. The output of the combiner 302 forms the filter output. A SELECT signal is applied to each of the filter elements to allow the filter to be selectively operated in one of three modes: (1) a 2T-spaced complex filter, (2) a T-spaced real filter, and (3) a T-spaced complex filter having half the length of the 2T-spaced complex filter. Of course, when the filter operates in a complex mode, complex weighting values are produced by the tap weight controller 308 and when the filter operates in a real mode, real weighting values are produced.

Figure 4:
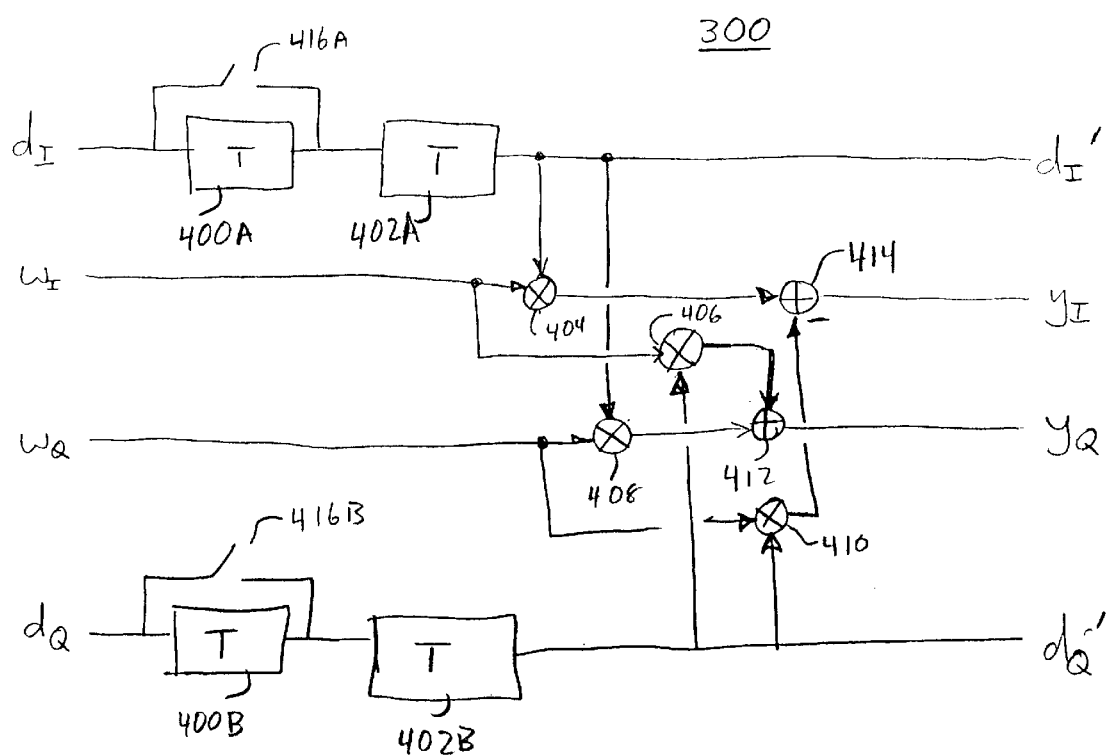
FIG. 4 depicts a block diagram of a filter element of the T/2T-spaced equalization filter configured as a complex filter.

FIG. 4 depicts a block diagram of one filter element (e.g., element $300_1$) that is configured for use in a complex filter. To form a multi-tap complex filter, each of the filter elements 300 are configured identical to the depicted element. To facilitate complex weighting on a filter tap, four multipliers 404, 406, 408 and 410 (these multipliers collectively form a complex multiplier) are used to multiply a complex input signal with I and Q (complex) weighting values ($w_I$ and $w_Q$) to produce weighted data signals that are added in adders 412 and 414 (note that adder 414 has an inverted input (forms a subtractor) to compensate for the negative value that results when the two imaginary components are multiplied with one another in multiplier 410). Additionally, the filter elements 300 contain a pair of symbol period (T) time delay elements 400A and 402A in the I data path and a pair of identical delay elements 400B and 402B in the Q data path. The delay elements 400A and 402A (400B and 402B) are series connected, with one element being bypassable through a switch 416A (416B). As such, one of the delay elements 400A (400B) can be bypassed to switch the filter from 2T-spaced to T-spaced. Such a bypass shortens the filter by half. The filter output signals $y_I$ and $y_Q$ are coupled to the combiner 302 of FIG. 3 and the delayed data signals $d_I'$ and $d_Q'$ are coupled to the next filter element 300.

Figure 5:
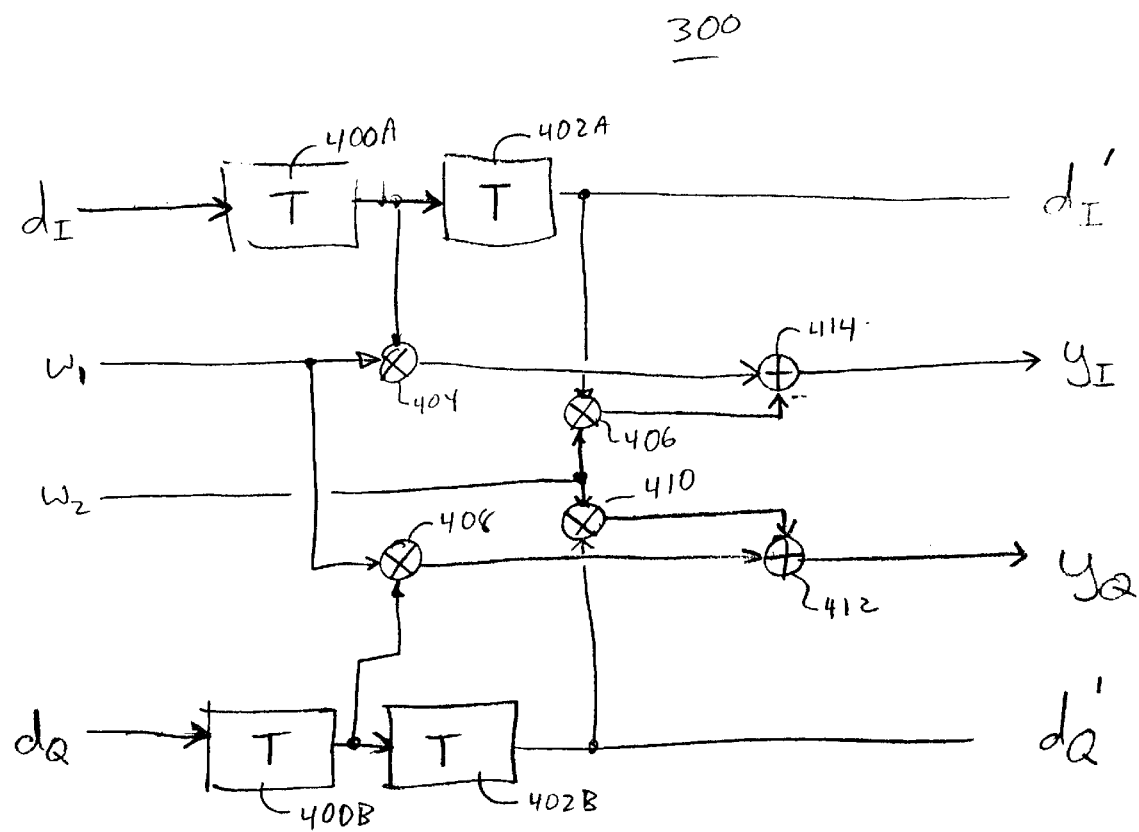
FIG. 5 depicts a block diagram of a filter element of the T/2T-spaced equalization filter configured as a real filter.

FIG. 5 depicts a block diagram of the filter element 300, configured as a T-spaced real filter where the four multipliers 404, 406, 408 and 410 are arranged in pairs. The first multiplier pair 404 and 408 are connected to the output of the first delay elements 400A and 400B and the second multiplier pair 406 and 410 are connected to the second delay elements 402A and 402B. Each multiplier multiplies a delayed data value with a real weighting value (w) such that the filter element 300 forms a pair of T-spaced real filter elements. The outputs of multipliers 404 and 406 are added together in adder 414. Similarly, the outputs of multipliers 408 and 410 are added together in adder 412. The output signals $y_I$ and $y_Q$ are coupled to the combiner 302 and the delayed data signals $d_I'$ and $d_Q'$ are coupled to the next filter element 300.

Figure 6:
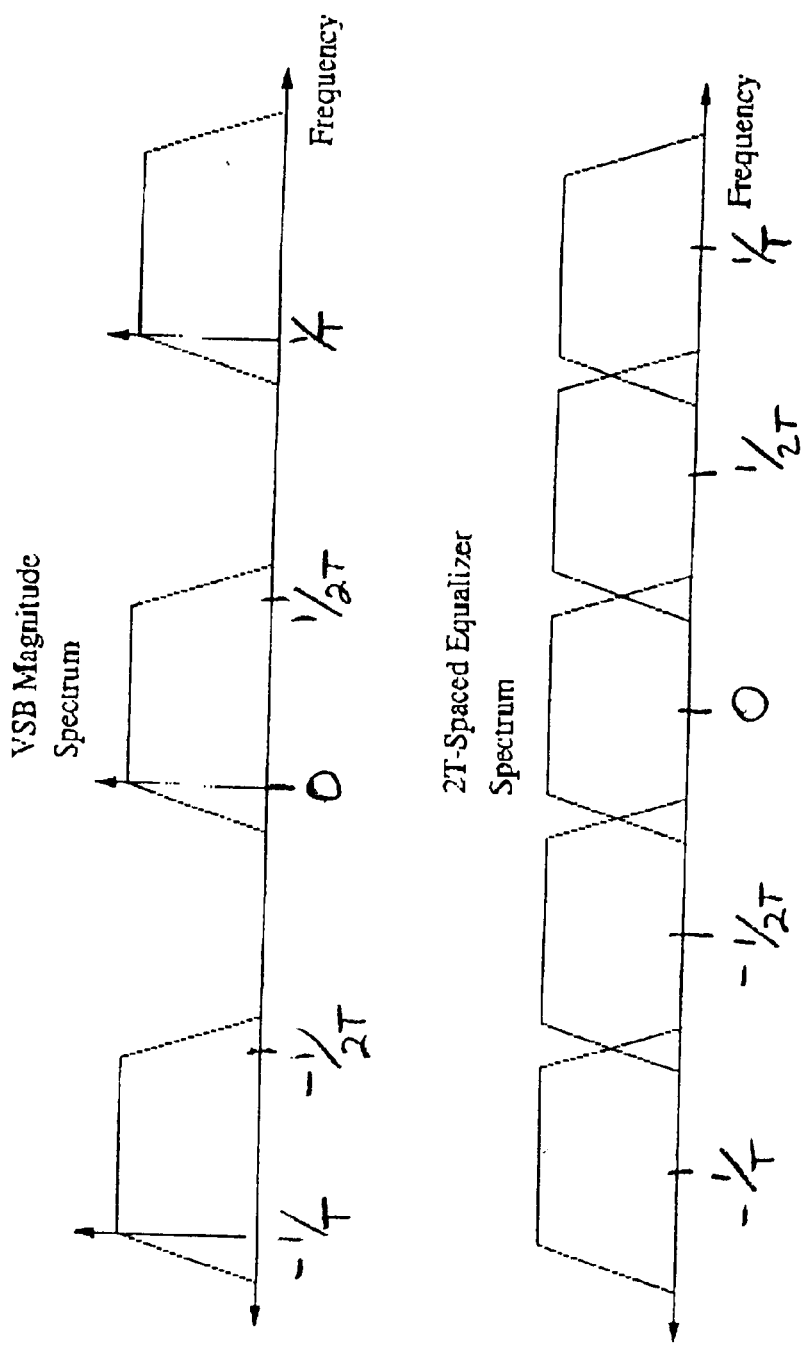
FIG. 6 depicts a frequency spectrum of a VSB signal as well as the passband of the 2T-spaced equalization filter of FIG. 3.

The frequency spectrum of the passband of a real 2T-spaced filter having 512 taps is illustrated in FIG. 6 along with the spectral content of the passband VSB signal, sampled at the symbol rate 1/T, and having its pilot tone located at DC. The real 2T-spaced filter has a response that is periodic in frequency with period 1/2T and symmetric about DC. Because the filter response is periodic with 1/2T, the equalizer produces perfect compensation for any signal bandlimited to 1/2T. The passband VSB signal has excess bandwidth slightly larger than 1/2T due to filter rolloff. Because the energy of the VSB signal is mostly constrained to the 1/2T bandwidth, the 2T-spaced equalizer will provide very good compensation in practice, with respect to the T-spaced equalizer.

Alternate embodiments of the 2T-spaced equalizer involve the use of a complex 2T-spaced equalizer and/or different centering of the VSB passband spectrum with respect to DC.

A selectable filter length provides added flexibility in equalizer operation and use. For example, in many situations, a T-spaced filter has better filtering performance than a 2T-spaced filter. However, certain ghost and echo cancellation situations require a longer time span (i.e., a longer filter) to accurately filter the signals. As such, for these situations, a 2T-spaced filter can have better performance than a T-spaced filter. To enable the equalizer to flexibly filter a variety of signaling situations, a switchable T/2T-spaced filter is preferred. In an alternative embodiment, the use of T or 2T spacing can be fixed by arranging the multiplier connections within the filter elements to form either T or 2T spaced filters.

Figure 7:
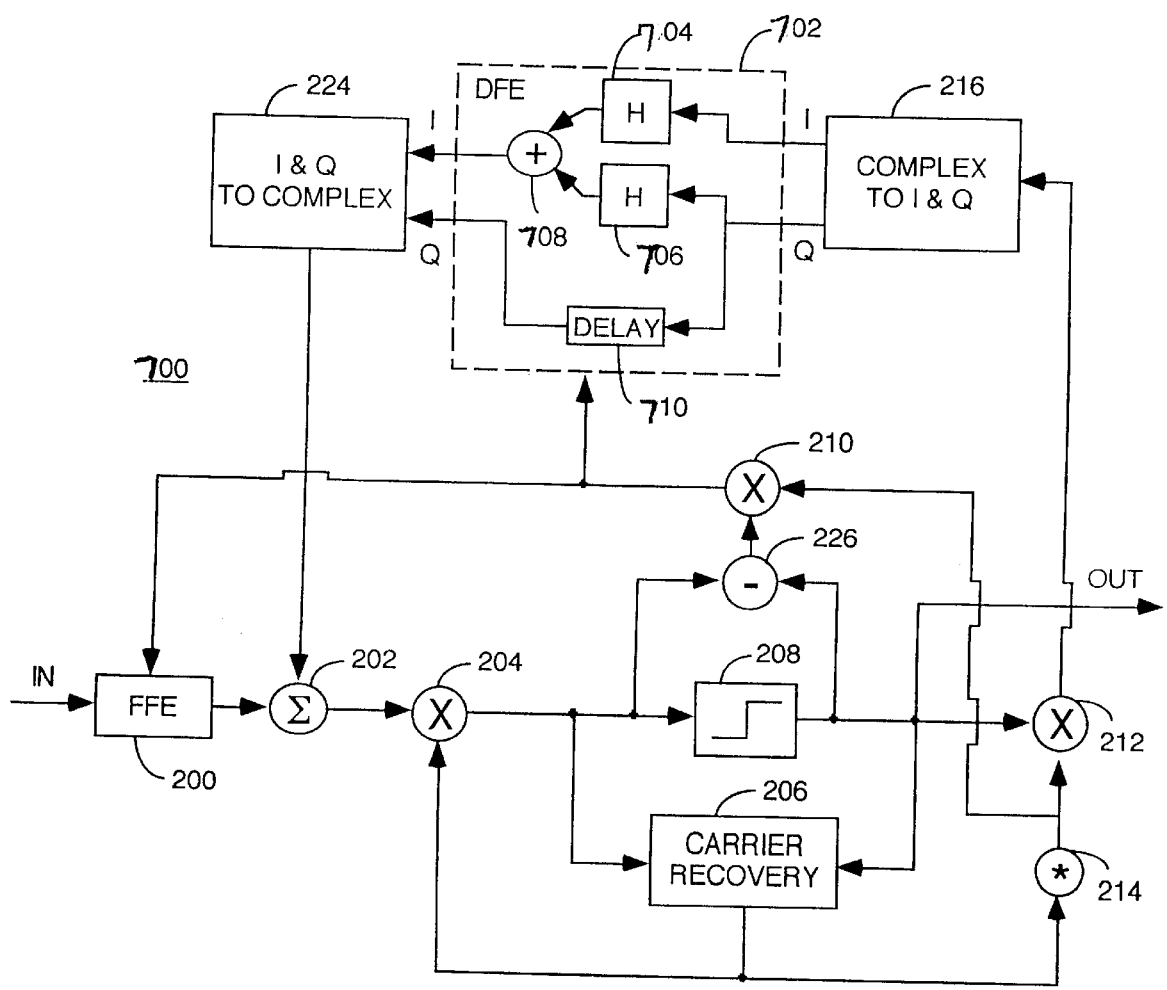
FIG. 7 depicts a passband equalizer in accordance with a second embodiment of the present invention.

FIG. 7 depicts a detailed block diagram of a passband equalizer 700 in accordance with a second embodiment of the present invention. In this embodiment, the DFE 702 is further modified to perform equalization only upon the I channel data thus reducing the complexity of the filters 704 and 706 of the DFE 702. Many of the components within the second embodiment are substantially similar to those in the first embodiment and, as such, those common components are given the same reference numerals as used in FIG. 2 and those components will not be described again.

The DFE 702 of the second embodiment of the invention comprises a pair of adaptive filters 704 and 706 that are coupled to the I and Q ports of the complex to I&Q converter 216. The adapted signals from the filters 704 and 706 are coupled to a combiner 708, and the combiner's output is coupled to the I input of the I&Q to complex converter 224. The Q information from the complex to I&Q converter 216 is not adaptively filtered to produce a filtered Q signal. To compensate for the delay through the filters 704 and 706, a delay unit 710 having a delay equal to the length of the delay through the filters 704 and 706 and the combiner 708 is used in the Q data path. The delayed Q component and the adaptively filtered I component are respectively applied to the I and the Q input terminals of the I&Q to complex converter 224 to produce an adaptively filtered complex signal that is applied to combiner 202. The filters 704 and 706 can be either T-spaced or 2T-spaced as discussed above.

In this embodiment, as with the previous embodiment, the two cross-coupled filters for the Q-channel that are usually present in a quadrature passband equalizer are not used, thus the invention simplifies the structure of the equalizer making it simpler to implement using hardware, i.e., only two filters are used in lieu of four filters. Additionally, the cross-coupled I-channel filters that can be implemented as T-spaced or 2T-spaced filters as discussed above.

Although various embodiments which incorporate the teachings of the present invention have been shown and described in detail herein, those skilled in the art can readily devise many other varied embodiments that still incorporate these teachings.

What is claimed is:

1. A passband equalizer comprising:
   a feed forward equalizer containing at least one equalization filter;
   a decision feedback equalizer that is supplied with separate in-phase and quadrature components of a complex signal containing a first adaptive filter for only filtering the in-phase (I) component and a second adaptive filter for only filtering the quadrature (Q) component without filtering a cross-coupled component of the complex signal; and
   a summer for summing an output of the feed forward equalizer with an output of the decision feedback equalizer.

2. The passband equalizer of claim 1 wherein the first or second adaptive filters are complex 2T-spaced filters.

3. The passband equalizer of claim 2 wherein the complex 2T-spaced filters further comprise:
   a plurality of complex multipliers, where each complex multiplier is separated from each other complex multiplier by a time delay element having a delay of 2T, where T is a symbol period of a symbol within the complex signal, and each complex multiplier multiplies a delayed input signal with a weighting value to produce a weighted signal; and
   a combiner for adding the weighted values to produce an equalized signal.

4. The passband equalizer of claim 3 wherein the time delay element contains a first delay element and a second delay element and the complex 2T-spaced equalizer further comprises a switch for bypassing the first delay element to change the complex 2T-spaced filter into a complex T-spaced filter.

5. The passband equalizer of claim 3 wherein the weighting value is generated by a blind equalization algorithm.

6. The passband equalizer of claim 1 wherein said equalization filter is either T-spaced or 2T-spaced.

7. The passband equalizer of claim 1 wherein the equalization filter is T-spaced and the first and second adaptive filters are 2T-spaced.

8. The passband equalizer of claim 1 further comprising:
   a I&Q to complex converter that converts equalized I and Q signals from the decision feedback equalizer (DFE) into a complex DFE signal;
   a combiner for combining an output of a feed forward equalizer (FFE) with the complex DFE signal;
   a first rotator for derotating the complex signal produced by the combiner;
   a carrier recovery circuit for producing a carrier signal that is used to derotate the complex signal from the combiner;
   quantizer for quantizing the complex signal from the first rotator;
   a subtractor for generating an error signal represented by the difference between the derotated complex signal and the quantized signal;
   a second rotator for rotating the error signal using a complex conjugate of the carrier signal, where the rotated error signal is used by a blind equalization algorithm to determine tap weights for the FFE and DFE filters;
   a third rotator for rotating the quantized signal using a complex conjugate of the carrier signal to produce a rotated quantized signal; and
   a complex to I&Q converter for producing and the I and Q signals that are equalized are applied to the DFE from the rotated quantized signal.

9. The passband equalizer of claim 8 wherein said first or second adaptive filters are complex 2T-spaced filters having every other delay element capable of being bypassed to form a T-spaced filter.

10. An adaptive filter for filtering vestigial sideband (VSB) signals that have a symbol duration of T, the filter comprising:
    a plurality of complex multipliers, where each multiplier is separated from each other complex multiplier by a time delay element having a delay of 2T, where T is a symbol period of a symbol within the complex signal, and each complex multiplier multiplies a delayed input signal with a complex weighting value to produce a weighted signal, wherein the time delay element contains a first delay element and a second delay element and the adaptive filter further comprises a switch for bypassing the first delay element to change the 2T-spaced filter into a T-spaced filter; and
    a combiner for adding the weighted values to produce an equalized signal.

11. An adaptive filter for filtering vestigial sideband (VSB) signals that have a symbol duration of T, the filter comprising:
    a plurality of complex multipliers, where each multiplier is separated from each other complex multiplier by a time delay element having a delay of 2T, where T is a symbol period of a symbol within the complex signal, and each complex multiplier multiplies a delayed Input signal with a complex weighting value to produce a weighted signal, wherein each complex multiplier contains four real multipliers that are selectively arranged to form a T-spaced real filter by having a first pair of real multipliers connected to a first time delay element and a second pair of real multipliers connected to a second time delay element; and
    a combiner for adding the weighted values to produce an equalized signal.

12. A selectable adaptive filter for filtering vestigial sideband (VSB) signals that have a symbol duration of T, the filter comprising:
    a plurality of complex multipliers, where each complex multiplier is separated from each other complex multiplier by a time delay element having a delay of 2T, where T is a symbol period of a symbol within the complex signal, and each complex multiplier multiplies a delayed input signal with a weighting value to produce a weighted signal;

a combiner for adding the weighted values to produce an equalized signal; and where the time delay element contains a first delay element and a second delay element and the adaptive filter further comprises a switch for bypassing the first delay element to change the complex 2T-spaced filter into a complex T-spaced filter.

13. The adaptive filter of claim 12 wherein each complex multiplier contains four real multipliers that are selectively arranged to form a T-spaced real filter by having a first pair of real multipliers connected to a first time delay element and a second pair of real multipliers connected to a second time delay element.

14. A digital television receiver comprising
a tuner for selecting a digital television signal from a plurality of available digital television signals;

an analog to digital converter for digitizing said selected digital television signal to produce a digitized signal;

a pilot recovery circuit for recovering a pilot tone from said digitized signal;

a timing recovery circuit for extracting symbol timing from the digitized signal;

a Nyquist filter for extracting a complex signal from the digitized signal;

a passband equalizer for adaptively filtering said complex signal, where said passband equalizer comprises:
a feed-forward equalizer (FFE); and
a decision feedback equalizer (DFE) that is supplied with separate in-phase and quadrature components of said complex signal containing a first adaptive filter for filtering the in-phase (I) component, a second adaptive filter for filtering the quadrature (Q) component, a combiner for combining the filter Q component with the filtered I component, and a delay for delaying the Q component for a duration equal to a delay through the first filter and the combiner.

15. The digital television receiver of claim 14 wherein the first or second adaptive filters are 2T-spaced filters.

16. The digital television receiver of claim 15 wherein the first or second adaptive filters are either T-spaced or 2T-spaced.

17. The digital television receiver of claim 14 wherein an FFE adaptive filter in the feed-forward equalizer is T-spaced and the first and second adaptive filters are 2T-spaced.

18. The digital television receiver of claim 17 wherein the 2T-spaced filters further comprise:
a plurality of multipliers, where each multiplier is separated from each other multiplier by a time delay element having a delay of 2T, where T is a symbol period of a symbol within the complex signal, and each multiplier multiplies a delayed input signal with a weighting value to produce a weighted signal; and a combiner for adding the weighted values to produce an equalized signal.

19. The digital television receiver of claim 18 wherein the weighting value is generated by a blind equalization algorithm.

20. The adaptive filter of claim 18 wherein the time delay element contains a first delay element and a second delay element and the adaptive filter further comprises a switch for bypassing the first delay element to change the 2T-spaced filter into a T-spaced filter.

21. The adaptive filter of claim 18 wherein each complex multiplier contains four real multipliers that are selectively arranged to form a T-spaced real filter by having a first pair of real multipliers connected to a first time delay element and a second pair of real multipliers connected to a second time delay element.

22. The digital television receiver of claim 14 wherein the passband equalizer further comprises:
a I&Q to complex converter that converts the DFE equalized I and Q signals into a complex DFE signal;

a combiner for combining an output of the FFE with the complex DFE signal;

a first rotator for derotating the complex signal produced by the combiner;

a carrier recovery circuit for producing a carrier signal that is used to derotate the complex signal from the combiner;

a quantizer for quantizing the complex signal from the first rotator;

a subtractor for generating an error signal represented by the difference between the derotated complex signal and the quantized signal;

a second rotator for rotating the error signal using a complex conjugate of the carrier signal, where the rotated error signal is used by a blind equalization algorithm to determine tap weights for the FFE and DFE filters;

a third rotator for rotating the quantized signal using a complex conjugate of the carrier signal to produce a rotated quantized signal; and a complex to I&Q converter for producing the I and Q signals that are equalized are applied to the DFE from the rotated quantized signal.

* * * * *